United States Patent [19]

Iwagaya

[11] Patent Number: 4,985,841
[45] Date of Patent: Jan. 15, 1991

[54] TAPPING CONTROL SYSTEM

[75] Inventor: Takashi Iwagaya, Hino, Japan

[73] Assignee: Fanuc Ltd., Minamitsuru, Japan

[21] Appl. No.: 138,842

[22] PCT Filed: Mar. 25, 1987

[86] PCT No.: PCT/JP87/00182
§ 371 Date: Nov. 23, 1987
§ 102(e) Date: Nov. 23, 1987

[87] PCT Pub. No.: WO87/05839
PCT Pub. Date: Oct. 8, 1987

[30] Foreign Application Priority Data

Mar. 25, 1986 [JP] Japan .................. 61-64847
Mar. 25, 1986 [JP] Japan .................. 61-64848

[51] Int. Cl.$^5$ .................. G06F 15/46; G06F 7/64; B23G 1/16
[52] U.S. Cl. .................. 364/474.33; 10/139 R; 364/474.31; 408/9; 408/11; 408/13; 408/17
[58] Field of Search .................. 10/129 R, 139 R; 364/474.3, 474.31, 474.33; 408/3, 9, 10, 11, 12, 13, 17, 140, 142; 409/67, 68, 69, 70

[56] References Cited

U.S. PATENT DOCUMENTS

| 3,854,353 | 12/1974 | Cutler | 364/474.33 |
| 4,079,235 | 3/1978 | Froyd et al. | 364/474.3 |
| 4,656,405 | 4/1987 | Kiya et al. | 408/10 X |
| 4,692,071 | 9/1987 | Hirota | 408/9 |
| 4,704,689 | 11/1987 | Asakura | 364/474.33 |

Primary Examiner—E. Michael Combs
Attorney, Agent, or Firm—Staas & Halsey

[57] ABSTRACT

Disclosed is a tapping control system capable of performing tapping work with high accuracy and reliability in a manner such that rotation of a tap by means of a digital spindle motor (1) is synchronized with axial drive of the tap by means of a servomotor (2).

A digital control circuit (5), used to drive the spindle motor, is supplied with a speed command from position control means (4). The speed command is based on a distributed pulse from an interpolating circuit (3a) for linear interpolation in accordance with the pitch value of a screw to be worked, and a feedback signal indicative of the rotational position of the spindle motor. Also, a servo-circuit (12) for the servomotor is supplied with a distributed pulse from the interpolating circuit. Thus, the two motors are driven synchronously.

According to an aspect of the present invention, the tapping work is performed in a fixed cycle such that forward and reverse rotations of the two motors are repeated to reciprocate the tap.

According to another aspect, switching means (7) is used to intermittently deliver the distributed pulses and the feedback signal, for selective tapping operation.

15 Claims, 3 Drawing Sheets

TAPPING CONTROL SYSTEM

BACKGROUND OF THE INVENTION

1. Field of the Invention

The present invention relates to a machine tool using a digital spindle motor for its principal-axis motor, and more particularly, to a tapping control system in which rotation of a tapping tool (tap) by means of a digital spindle motor is synchronized with axial movement of the tap by means of a servomotor, thereby ensuring ideal tapping work.

2. Description of the Related Art

In tapping work, a tap must be advanced over a predetermined distance while it makes one revolution. Thus, the rotation and axial advance of the tap must be synchronized completely.

In association with this, high-accuracy screw or gear cutting work is conventionally performed in a manner such that rotation of a tool and its feed relative to a workpiece are synchronized. For example, a principal-axis motor for tool rotation is rotated at a predetermined command speed. Rotation of a tool-feed motor is controlled in accordance with a pulse train, generated from a pulse coder attached to the tool-rotation motor, so that the two motors are rotated in synchronism with each other. In the synchronous control of this type, speed commands are given to the individual motors, that is, a speed control loop is used as a control loop. The righting moment of the speed control loop against variations of speed is small, and the rotational speed of the tool-rotation motor is likely to change as the load varies. As the rotational speed of the tool-rotation motor varies in this manner, the two motors becomes non-synchronous thereby lowering working accuracy. When tapping a deep hole by means of a small-diameter tap, the tap may sometimes be broken.

In connection with the synchronous control of the aforementioned type, a multi-function machine tool is conventionally used for various machine works. Various tools, such as a tapping tool, cutter, etc., can be replaceably mounted on a tool holder of the machine tool. However, this machine tool has problems with working accuracy on account of the aforesaid reasons.

In a system disclosed in Japanese Patent Disclosure No. 60-155319, for example, a feed driver is used to relatively move a workpiece and a tool. Rotation of a rotation driver, which is used to relatively rotate the workpiece and the tool in accordance with the amount of feed by the feed driver, is controlled. This system, however, is intended for screw working only. Although it can therefore perform high-accuracy screw working, the system, disclosed in 60-155319 which uses a servo-motor incapable of high-speed rotation, cannot perform work other than screw working despite an improvement for the attachment of various tools. In particular, the system cannot actually perform deep cutting in which the tool is subjected to a substantial load.

SUMMARY OF THE INVENTION

An object of the present invention is to provide a tapping control system in which rotation and axial advance of a tap are synchronized completely, and the tap is subjected to less resistance such that a relatively thin tap cannot be broken during tapping work.

Another object of the invention is to provide a tapping control system in a multi-function machine tool which is adapted to be replaceably mounted with various tools, whereby both deep cutting, such as milling, and high-accuracy tapping can be performed.

In order to achieve the above object, according to an aspect of the present invention, a tapping control system for a machine tool using, comprises as a principal axis motor a digital spindle motor and being controlled by means of a digital control circuit, position control means for delivering a speed command to the digital control circuit in accordance with a distributed pulse from an interpolating circuit and a feedback signal outputted from a pulse coder in response to the rotation of the digital spindle motor, thereby effecting feedback control of the rotational position of the spindle motor, wherein pulses are distributed individually to the control circuit and a servo-circuit of a servomotor for axially moving a tool, by means of the interpolating circuit for linear interpolation in accordance with the pitch value of a screw to be worked, so that the spindle motor and the servomotor are driven in synchronism with each other. In tapping operation, both the spindle motor and the servomotor are rotated forwardly for a predetermined amount of tapping work. Thereafter, both the spindle motor and the servomotor are rotated reversely, thereby rotating and retreating a tap through a distance less than the predetermined amount. This alternating motion is repeated in a fixed cycle.

According to another aspect of the present invention, switching means for switching open control over to feedback control is provided along with the position control means. At the time of tapping work, the switching means is shifted to a feedback control position. Pulses are distributed individually to the digital control circuit and the servo-circuit by means of the interpolating circuit for linear interpolation in accordance with the pitch value of the screw to be worked. Thus the spindle motor and the servomotor are driven in synchronism with each other.

According to the present invention, as described above, the digital spindle motor for rotating the tap and the servomotor for axially moving the tap are driven individually in response to the distributed pulses linearly interpolated by, the interpolating, circuit. The two motors are synchronized so that the rotational position and the axial position of the tap correspond to each other. After the predetermined tapping work is finished, the tap is retracted through the distance less than the predetermined amount. The tapping work is thus performed on the basis of alternating motion. Accordingly, chips are eliminated, so that the tap is subjected to less resistance. The tapping work can be effected with ease, and relatively thin taps cannot be broken by the tapping work.

In a tapping mode, according to the present invention, the digital spindle motor, for use as the principal-axis motor for tool rotation, and the motor for tool feed are driven in response to the distributed pulses from the interpolating circuit for linear interpolation in accordance with the pitch command value read from a working program. Therefore, rotation of the two motors can be synchronized with each other. Further, the digital spindle motor is digitally controlled so that it can satisfactorily follow up the command. Accordingly, high-accuracy rigid tapping is accomplished without using a floating holder as the tool holder. In a deep-cut mode, on the other hand, a position control loop for the spindle motor is released, and the spindle motor is rotated with high torque and at high speed. Thus, deep cutting can be performed while resisting effects of the load.

DETAILED DESCRIPTION OF THE PREFERRED EMBODIMENTS

Figure 1:
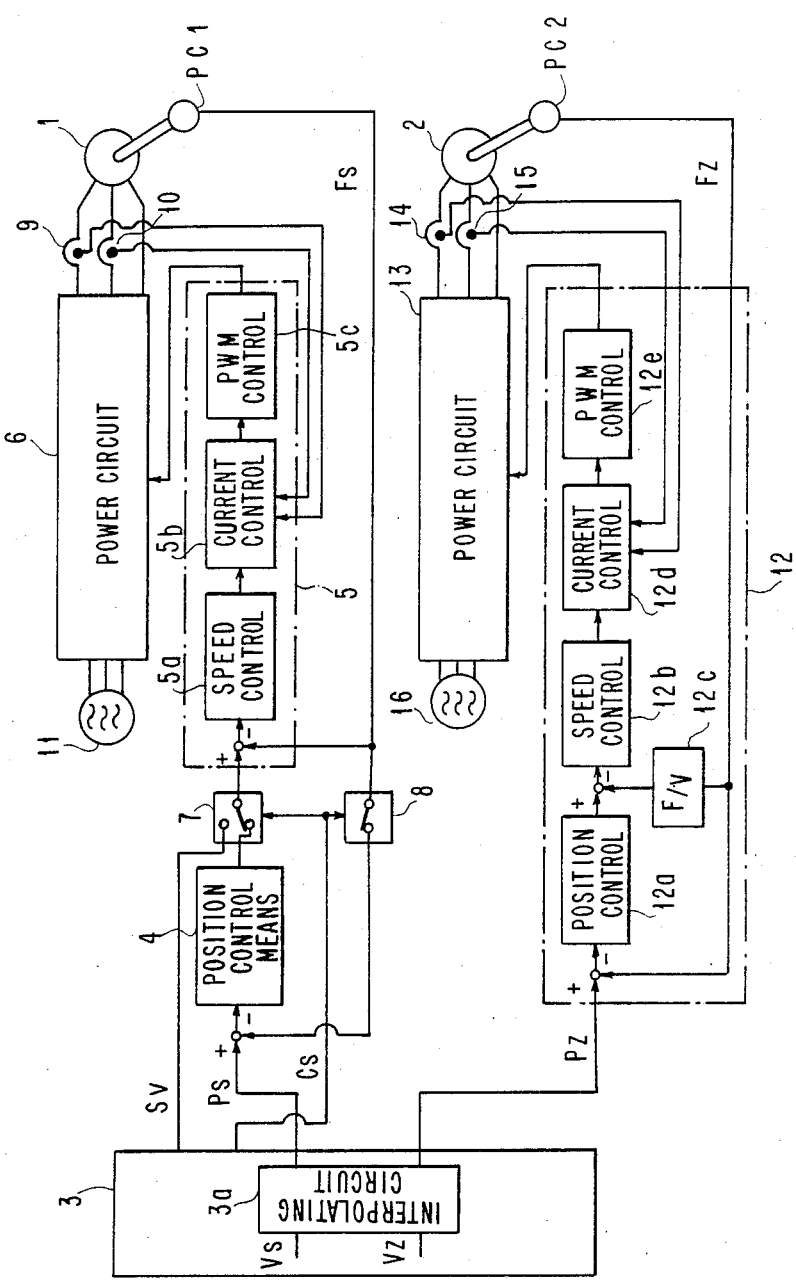
FIG. 1 is a control block diagram of a machine tool for a tapping control system according to a preferred embodiment of the present invention.

FIG. 1 shows a tapping control system for a multifunction machine tool according to an embodiment of the present invention. The machine tool, which operates in various working modes, including the tapping mode and the deep-cut mode, comprises an AC digital spindle motor 1, for use as a principal-axis motor for tool rotation, and an AC servomotor 2 for tool feed. A tap 21 mounted on a tool holder 20 (FIG. 4) is rotated relatively to a workpiece (not shown) by means of the digital spindle motor 1. The tap 21 is driven in the working direction, with respect to the workpiece, by means of the feed motor 2. The spindle motor 1 is rotated at high speed so as to resist a substantial load at the time of deep cutting, e.g., milling. The tool holder 20 is replaceably fitted with a plurality of tools, such as the tap 20 and a milling cutter (not shown), by means of an automatic tool replacer. The holder 20 can also hold a tap 21 for rigid tapping in a nontelescopic manner.

Numeral 3 denotes a numerical control unit including an interpolating circuit 3a. Symbol PC1 denotes a pulse coder which produces a feedback pulse Fs with every rotation of the spindle motor 1 through a predetermined angle. Numeral 4 denotes position control means which delivers, as a speed command value, the difference between a distributed pulse Ps from the interpolating circuit 3a and the feedback pulse Fs from the pulse coder PC1. The means 4 includes an error register (not shown) and a D/A converter (not shown). Numerals 7 and 8 denote switching means which are switched in response to a switching command CS from the numerical control unit 3. Switching means 7 and 8 are adapted to be switched to a feedback control position, as shown in FIG. 1, when the spindle motor 1 is subjected to feedback control at the time of tapping work. More specifically, the switching means 7 applies the output of the position control means 4 to a digital control circuit 5, while the switching means 8 applies the feedback pulse Fs to the position control means 4. When the feedback control is not expected, on the other hand, the means 7 and 8 are shifted to an open control position. In other words, the switching means 7 is shifted to apply a speed command SV for the spindle motor 1, delivered from the numerical control unit 3, to the digital control circuit 5, while the switching means 8 is shifted to prevent the feedback pulse Fs from being applied to the position control means 4.

The digital control circuit 5 includes a speed control section 5a, current control section 5b, and a PWM (pulse width modulation) control section 5c. The speed control section 5a delivers a torque command in response to the difference between the speed command from the position control means 4 or the numerical control unit 3 and a present speed based on the feedback pulse Fs from the pulse coder PC1. On receiving this torque command, the current control section 5b delivers a command current to each phase of the spindle motor 1 in accordance with a present driving current from current detectors 9 and 10. Thus, the PWM control section 5c modulates the pulse width of the command current output for each phase. Thereupon, the digital control circuit 5 delivers the modulation output thus obtained to a power circuit 6, thereby driving the same. In this manner, the spindle motor 1 is driven at a command speed.

Figure 2:
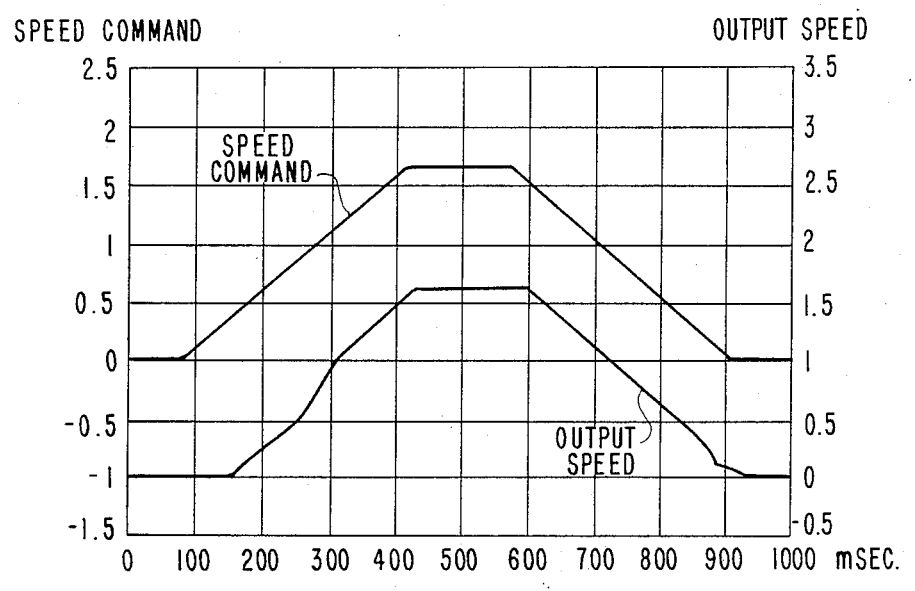
FIG. 2 is a graph showing the follow-up performance of a conventional spindle motor.
Figure 3:
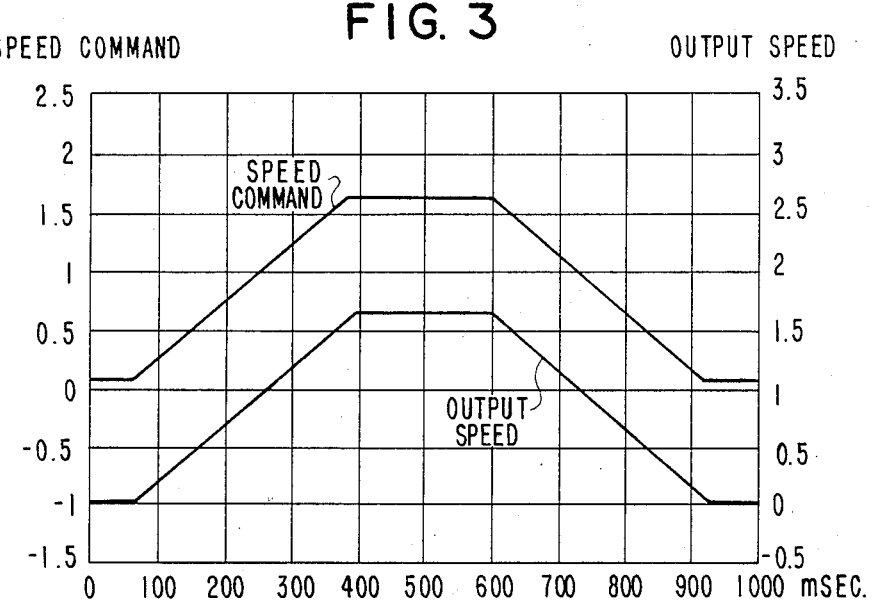
FIG. 3 is a graph showing the follow-up performance of a digital spindle motor incorporated in the present invention.

The digital control circuit 5 is of a conventional type (e.g., Japanese Patent application No. 60-36051). For comparison, FIGS. 2 and 3 show motor follow-up performances for the cases in which the spindle motor is driven by means of the digital control circuit 5 and by the conventional system, individually. According to the known system, as shown in FIG. 2, the spindle motor follows up the speed command with a considerable delay. On the other hand, as shown in FIG. 3, the spindle motor controlled by the digital control circuit 5 accurately follows up the speed command without any substantial delay.

Meanwhile, a servo-circuit 12, of a conventional type, detects the difference between a distributed pulse Pz from the interpolating circuit 3a and a feedback pulse Fz from the pulse coder PC2, by means of an error register in its position control section 12a. The output of this error register is converted into an analog signal by means of a D/A converter of the control section 12a, and is delivered as a speed command. The difference between this speed command and an actual speed from an F/V converter 12c is amplified by means of a speed control section 12b, and is delivered as a torque command. In a current control section 12a, a driving current command for each phase is outputted in accordance with this torque command and an actual driving current value from current detectors 14 and 15 which are used to detect the driving current for the servomotor 2. On receiving this driving current command, a PWM control section 12e modulates the pulse width of the command. This modulation output is used to drive a power circuit 13, thereby driving the AC servomotor 2. Numerals 11 and 16 denote threephase power sources, individually.

The tapping operation will now be described.

Figure 4:
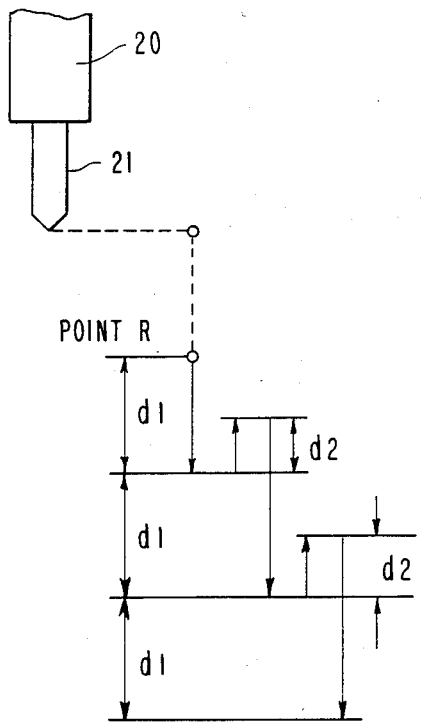
FIG. 4 is a schematic diagram showing a fixed cycle used in a preferred embodiment of the invention.

As shown in FIG. 4, tapping work is performed in a fixed cycle such that the tap 21 is first fed quickly to a working start point R. The spindle motor 1 for importing tool rotation and the servomotor 2 for tool feed are then rotated forwardly, thereby effecting tapping for a predetermined distance d1 in a tapping direction (hereinafter referred to as Z-axis direction). Subsequently, the spindle motor 1 and the servomotor 2 are rotated reversely so that the tap 21, while being rotated, is retracted or moved reversely to the work-advancing direction, by a predetermined distance d2 (d1 > d2) shorter than the depth of finished work. Then, the spindle motor 1 and the servomotor 2 are rotated forwardly, thereby effecting tapping again for the predetermined depth d1 (moved distance in the Z-axis direction is d1 + d2), in the same manner as aforesaid. Thereafter, the tap 21 is retreated again over the distance d2. When the depth of the tapping work, accompanied with such reciprocation, reaches a predetermined depth as instructed, the motors 1 and 2 are rotated reversely, so that the tool 4 is disengaged entirely from a tapping hole. Then, the tool is fed quickly to a position at a predetermined height, where it stands ready for the next working process.

The tapping work is performed on the basis of the aforementioned fixed cycle. Referring now to FIG. 1, the tapping operation will be described.

First, if a tapping command is read from a working program by the numerical control unit 3, a tapping tool is mounted on the tool holder by means of the automatic tool exchanger (not shown), and the switching command CS is delivered from the numerical control unit 3. In response to the command CS, the switching means 7 and, 8 are shifted to the feedback control position. The speed commands Vs and Vz for the spindle motor 1 and the servomotor, which correspond to a pitch value designated by the working program, are applied to the interpolating circuit 3a. Thereupon, the distributed pulses Ps and Pz, interpolated linearly, are delivered from the interpolating circuit 3a to the position control means 4 and the position control section 12a of the servo-circuit 12, respectively.

More specifically, if the pitch or the distance between each two adjacent threads of the screw to be worked is P, and if the number of threads to be formed on the workpiece is i, the aforementioned pulse distribution by the interpolating circuit 3a is performed in a manner such that the servomotor 2 advances the tap 21 axially by a distance iP while the spindle motor 1 causes the tap 21 to make one revolution.

Subsequently, the position control means 4 delivers, as the speed command, the difference between the distributed pulse Ps and the feedback pulse Fs from the pulse coder PC1, to the digital circuit 5. Thereupon, the digital circuit 5 executes speed control such that the spindle motor 1 is rotated forwardly at the command speed by means of the power circuit 6. Meanwhile, the servo-circuit 12 also executes the aforesaid position control and speed control in accordance with the distributed pulse Pz and the feedback pulse Fz from the pulse coder PC2, so that the servomotor 2 is rotated forwardly by means of the power circuit 13. As a result, forward rotation of the spindle motor 1 and the servomotor 2 is synchronized with each other and at a required rotational speed ratio. Thus, in working the screw with i threads, for example, the tap 21 is axially driven by the distance iP for each revolution thereof, thereby effecting the tapping work with the pitch provided by the working program.

When the moved distance of the tap 21 (or amount of pulse distribution to the servomotor 2) attains d1, the speed commands Vs and Vz for the spindle motor 1 and the servomotor 2 are delivered in the opposite (or negative) direction. Thereupon, the interpolating circuit 3a delivers the distributed pulses Ps and Pz in the opposite direction through the same linear interpolation as aforesaid, thereby reversely rotating the spindle motor 1 and the servomotor 2 in synchronism with each other. This reverse operation is continued until the moved distance of the tap 21 attains d2. After the retreated distance of the tap 21 attains d2, the tap 21 is rotated forwardly again, and is moved by (d1+d2) in the Z-axis direction. Then, the reverse direction is started in the same manner as aforesaid. Thereafter, the processes in the same fixed cycle are re-executed, and the workpiece is worked to the designated fixed depth position (Z-axis position).

Thus, the spindle motor 1, used to rotate the tap 21, and the servomotor 2 are driven individually in accordance with the pulses distributed as a result of the linear interpolation in the interpolating circuit 3a. Accordingly, the spindle motor 1 and the servomotor 2 are sychronized. The respective rotational positions of the motors 1 and 2, that is, the rotational position and the axial position of the tap 21, correspond entirely to each other. Even though the spindle motor 1 and the servomotor 2 are rotated in either direction, the aforesaid predetermined positional relationship is maintained continually, thereby permitting accurate tapping work. Moreover, the tap 21 advances in the working direction for tapping while rotating forwardly, and then retreats by the fixed distance while rotating reversely. Thus, chips are eliminated, so that the tap 21 is subjected to less resistance, and can less frequently be broken.

If a deep cutting command, e.g., a milling command, is read from the working program, on the other hand, a milling tool is mounted on the tool holder 20. Thereafter, the switching command CS is delivered from the numerical control unit 3, whereupon the switching means 7 and 8 are shifted to the open control position. Thus, the feedback pulse Fs from the pulse coder PC1 is stopped from being applied to the position control circuit 4, while the speed command Sv from the numerical control unit 3 is applied to the digital control circuit 5 through the switching means 7. Consequently, the spindle motor 1 starts to rotate at a speed corresponding to the speed command Sv, that is, at high speed, thus effecting deep cutting, such as milling.

I claim:

1. A tapping control system for a machine capable of tapping a screw with a tap or cutting with a cutting tool and using, as a principal-axis motor, a digital spindle motor controlled by means of a digital control circuit, and a servo-motor for tool feed and being controlled by a servo-circuit, the system comprising,.
    an interpolating circuit for distributing pulses individually to said digital control circuit and the servo-circuit to effect linear interpolation in accordance with the pitch value of the screw to be worked.
    a pulse coder responsive to rotation of the digital spindle motor for outputting a feedback signal indicative of a rotational speed of the spindle motor.
    position control means for delivering a speed command to said digital control circuit in accordance with the distributed pulses from the interpolating circuit and the feedback signal outputted from the pulse coder to effect feedback control of the rotational position of said spindle motor distributing pulses individually to said digital control circuit and a servo-circuit for a servomotor for axially moving a tool, wherein said spindle motor and said servomotor are driven in synchronism with each other, said spindle motor and said servomotor being forwardly rotatable in a tapping mode for a predetermined amount of tapping work, and said spindle motor and said servomotor being reversely rotatable to retract the tap through a distance less than said predetermined amount of forward rotation, said forward and reverse rotatable motion being repeated alternatingly in a fixed cycle.

2. A tapping control system according to claim 1, wherein said digital spindle motor and said servomotor are driven with a predetermined rotational speed ratio corresponding to said pitch value of said screw.

3. A tapping control system according to claim 2, further comprising:
a tool holder for nontelescopically mounting the tap.

4. A tapping control system according to claim 1 further comprising:
a tool holder for nontelescopically mounting the tap.

5. A tapping control system for a machine capable of tapping a screw with a tap or cutting with a cutting tool using, as a principal-axis motor, a digital spindle motor controlled by means of a digital control circuit, the system comprising,
an interpolating circuit for distributing pulses individually to said digital control circuit and the servocircuit to effect linear interpolation in accordance with the pitch value of the screw to be worked,
a pulse coder responsive to rotation of the digital spindle motor for outputting a feedback signal indicative of a rotational speed of the spindle motor,
position control means for delivering a speed command to said digital control circuit in accordance with the distributed pulse from the interpolating circuit and the feedback signal outputted from the pulse coder to effect feedback control of the rotational position of said spindle motor; and
switching means for switching the system from an open control position over to a feedback control position; said switching means switching to the feedback control position during tapping, said interpolating circuit distributing pulses individually to said digital control circuit and said servo-circuit for linear interpolation in accordance with the pitch value a screw to be worked, wherein said spindle motor and said servomotor are driven in synchronism with each other.

6. A tapping control system according to claim 4, wherein said digital spindle motor and said servomotor are driven with a predetermined rotational speed ratio corresponding to said pitch value of said screw.

7. A tapping control system according to claim 6, wherein said switching means is in a switching position corresponding to said open control position at the time of deep cutting, thereby preventing said distributed pulses and said feedback signal from being applied to said position control means.

8. A tapping control system according to claim 5, wherein said digital spindle motor rotates at high speed for deep cutting when the system is switched to the open control mode.

9. A tapping control system according to claim 8, wherein said switching means is in a switching position corresponding to said open control position at the time of deep cutting, thereby preventing said distributed pulses and said feedback signal from being applied to said position control means.

10. A tapping control system according to claim 5, further comprising:
a tool holder for nontelescopically mounting the tap at the time of said tapping work, and the deep cutting tool at the time of deep cutting.

11. A tapping control system according to claim 10, wherein said switching means is in a switching position corresponding to said open control position at the time of deep cutting, thereby preventing said distributed pulses and said feedback signal from being applied to said position control means.

12. A tapping control system according to claim 5, wherein said switching means is in a switching position corresponding to said open control position at the time of deep cutting, thereby preventing said distributed pulses and said feedback signal from being applied to said position control means.

13. A tapping control system according to claim 5, wherein said digital control circuit includes a speed control section, which receives a speed command from either said position control means or a numeric control unit which includes said interpolating circuit, depending on the selected mode, a current control section coupled to said speed control section, and a pulse width modulation control section for delivering a torque command to the spindle motor.

14. A tapping control system according to claim 5, further comprising a numeric control unit which includes the spindle motor interpolating circuit and the servomotor interpolating circuit, and wherein the numeric control unit delivers a speed command to the digital control circuit when the system is switched to the open control mode, and the spindle motor interpolating circuit delivers a pulse distribution to the position control means which then derives a speed command and delivers it to the digital control circuit when the system is switched to the feedback control position.

15. A control system for a multi-function machine tool having a digital spindle motor for tool rotation and a servomotor for tool feed, comprising:
a digital control circuit, coupled to the digital spindle motor, or controlling the digital spindle motor;
a servo-circuit, coupled to the servomotor, for controlling the servomotor,
a control unit, coupled to the digital control circuit and the servo-circuit, for outputting a speed command, the control unit including an interpolating circuit for outputting a linearly interpolated pulse distribution individually to the digital control circuit and to the servo-circuit based on predetermined speed commands for the digital spindle motor and the servomotor fed to the interpolating circuit and correlating to a preselected pitch value,
a pulse coder, coupled to the digital spindle motor and being responsive to rotation of the digital spindle motor, for outputting a feedback signal indicative of a rotational speed of the spindle motor,
position control means responsive to the linearly interpolated pulse distribution supplied by the interpolating circuit and the feedback signal supplied by the pulse coder, for outputting a speed command to said digital control circuit based on a difference between the linearly interpolated pulse distribution and the feedback signal,
speed control means responsive to the speed command outputted from either the control unit or the position control means, and the feedback signal outputted from the pulse code, for outputting a torque command for the digital spindle motor based on a difference between either of the speed commands and the feedback signal, and
switch means for switching the system from an open control position over to a feedback control position; said switching means switching to the feedback control position during tapping, said interpolating circuit distributing pulses individually to said digital control circuit and said servocircuit for linear interpolation in accordance with the pitch value a screw to be worked, wherein said spindle motor and said servomotor are driven in synchronism with each other.

* * * * *

UNITED STATES PATENT AND TRADEMARK OFFICE
CERTIFICATE OF CORRECTION

PATENT NO. : 4,985,841
DATED : January 15, 1991
INVENTOR(S) : Iwagaya It is certified that error appears in the above-identified patent and that said Letters Patent is hereby corrected as shown below:

ON TITLE PAGE: "ABSTRACT", lines 5 and 6 should be a continuous paragraph;
lines 16-22, delete in their entirety and insert the following: --The tapping work is performed in a fixed cycle such that forward and reverse rotations of the two motors are repeated to reciprocate the tap. A switch (7) is used to intermittently deliver the distributed pulses and the feedback signal, for selective tapping operation.--.

Col. 1, line 34, change "becomes" to --become--;
line 53, change "system," to --system--; and after "60-155319" insert a comma.

Col. 2, line 5, after "comprises" insert --a digital spindle motor--;
line 6, delete "a digital spindle motor";
line 36, after "Thus" insert a comma.

UNITED STATES PATENT AND TRADEMARK OFFICE
CERTIFICATE OF CORRECTION

PATENT NO. : 4,985,841
DATED : January 15, 1991
INVENTOR(S) : Iwayagaya

It is certified that error appears in the above-identified patent and that said Letters Patent is hereby corrected as shown below:

Col. 3, line 24, change "for,tool" to --for tool--.

Col. 4, line 51, change "import-" to --imparting--;
line 52, delete "ing".

Col. 5, line 61, change "d2.After" to --d2. After--;
line 62, change "d2,the" to --d2, the--.

Col. 6, line 46, change "motor." to --motor,--.

Signed and Sealed this

Twenty-third Day of June, 1992

Attest:

DOUGLAS B. COMER

*Attesting Officer*  *Acting Commissioner of Patents and Trademarks*